US012795242B2

(12) United States Patent
Aiba

(10) Patent No.: US 12,795,242 B2
(45) Date of Patent: Nov. 10, 2026

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Toshitaka Aiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 19/056,950

(22) Filed: Feb. 19, 2025

(65) Prior Publication Data

US 2025/0274663 A1 Aug. 28, 2025

(30) Foreign Application Priority Data

Feb. 26, 2024 (JP) ................................ 2024-026389

(51) Int. Cl.

*H04N 23/695* (2023.01)
*G02B 27/01* (2006.01)
*H04N 13/172* (2018.01)
*H04N 13/204* (2018.01)
(Continued)

(52) U.S. Cl.

CPC ....... *H04N 23/695* (2023.01); *G02B 27/0101* (2013.01); *H04N 13/172* (2018.05); *H04N 13/204* (2018.05); *H04N 23/632* (2023.01); *H04N 23/633* (2023.01); *H04N 23/6812* (2023.01); *H04N 23/683* (2023.01); *G02B 2027/0138* (2013.01)

(58) Field of Classification Search

CPC .. H04N 23/695; H04N 13/172; H04N 13/204; H04N 23/632; H04N 23/633; H04N 23/6812; H04N 23/683; G02B 27/0101; G02B 2027/0138

See application file for complete search history.

(56) References Cited

U.S. PATENT DOCUMENTS

| | | | |
|---|---|---|---|
| 7,292,270 | B2 | 11/2007 | Higurashi |
| 8,743,174 | B2 | 6/2014 | Imanishi |
| 8,780,184 | B2 | 7/2014 | Kusaka |

(Continued)

FOREIGN PATENT DOCUMENTS

| | | | |
|---|---|---|---|
| JP | 2004-302051 | A | 10/2004 |
| JP | 2006-311196 | A | 11/2006 |

(Continued)

OTHER PUBLICATIONS

JP 2004-302051 A, U.S. Pat. No. 7,292,270 B2 US 2007/0146488 A1.

(Continued)

*Primary Examiner* — Sinh Tran
*Assistant Examiner* — Zhenzhen Wu
(74) *Attorney, Agent, or Firm* — Venable LLP

(57) ABSTRACT

An electronic device includes: a processor; and a memory storing a program which, when executed by the processor, causes the electronic device to execute acquisition processing of acquiring information on orientation of an imaging apparatus during photography of an image; and to execute control processing of controlling, based on the information, whether to perform tilt correction on the image to bring a position corresponding to a horizontal direction during the photography closer to a position corresponding to a front direction.

16 Claims, 13 Drawing Sheets

(51) Int. Cl.
*H04N 23/63* (2023.01)
*H04N 23/68* (2023.01)

(56) References Cited

U.S. PATENT DOCUMENTS

| | | | | |
|---|---|---|---|---|
| 9,756,249 | B1 * | 9/2017 | Segapelli | H04N 5/144 |
| 2007/0146488 | A1 | 6/2007 | Higurashi | |
| 2009/0245768 | A1 * | 10/2009 | Uenaka | H04N 23/687 396/53 |
| 2011/0007133 | A1 | 1/2011 | Imanishi | |
| 2011/0013031 | A1 * | 1/2011 | Miyasako | H04N 23/68 348/241 |
| 2012/0069152 | A1 | 3/2012 | Kusaka | |
| 2019/0208141 | A1 * | 7/2019 | Oyama | H04N 23/698 |
| 2019/0251672 | A1 * | 8/2019 | Lim | G06T 3/20 |
| 2023/0385997 | A1 * | 11/2023 | Mohanty | G06N 3/044 |
| 2024/0080543 | A1 * | 3/2024 | Manzari | H04N 23/71 |

FOREIGN PATENT DOCUMENTS

| | | | |
|---|---|---|---|
| JP | 2011-017929 | A | 1/2011 |
| JP | 2012-090259 | A | 5/2012 |

OTHER PUBLICATIONS

JP 2006-311196 A.
JP 2011-017929 A, US 2011/0007133 A1 U.S. Pat. No. 8,743,174 B2.
JP 2012-090259 A, [0005], [0006], US 2012/0069152 A1 U.S. Pat. No. 8,780,184 B2.

* cited by examiner

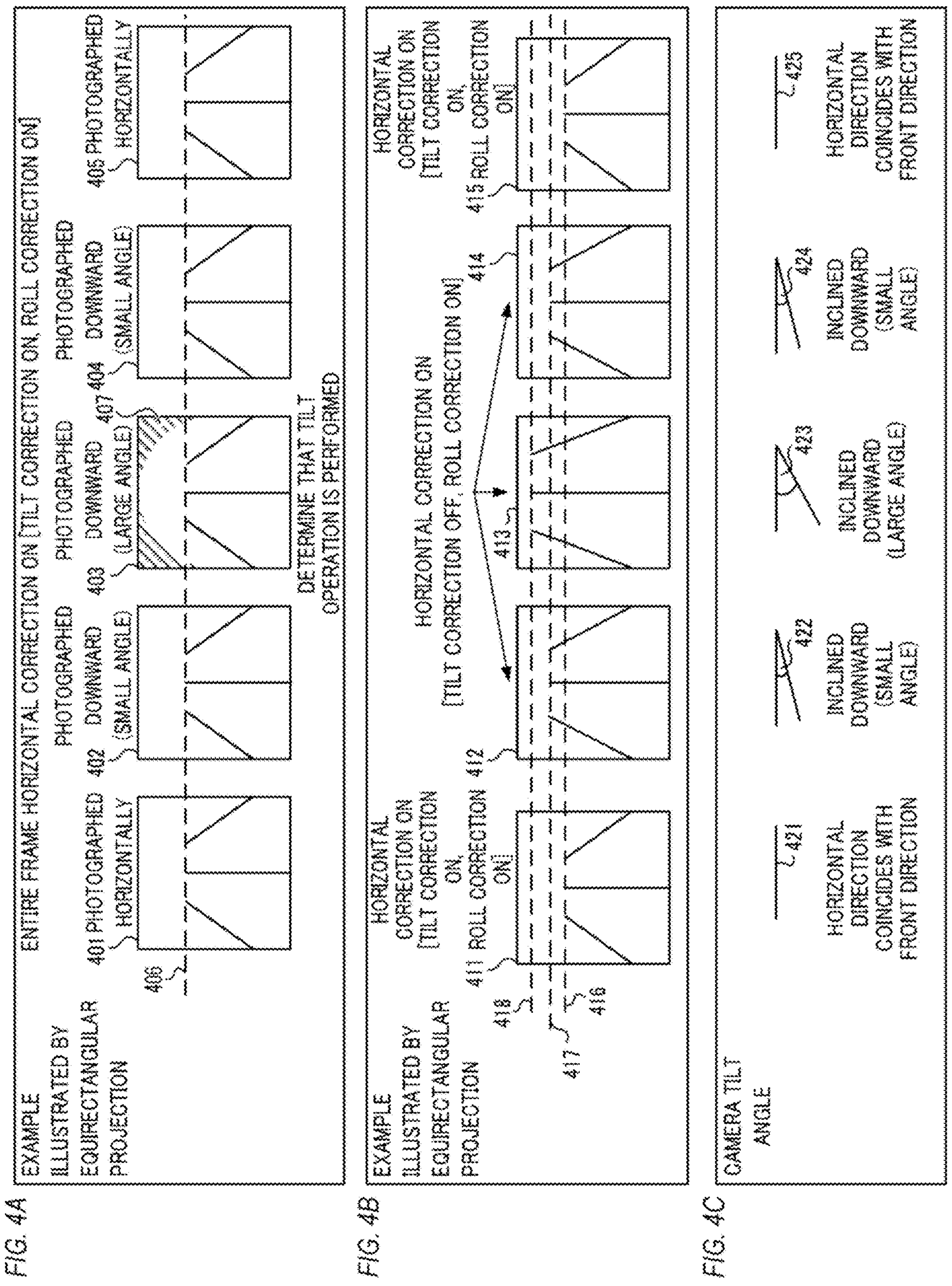
FIG. 4A
EXAMPLE ILLUSTRATED BY EQUIRECTANGULAR PROJECTION
ENTIRE FRAME HORIZONTAL CORRECTION ON [TILT CORRECTION ON, ROLL CORRECTION ON]
401 PHOTOGRAPHED HORIZONTALLY
402 PHOTOGRAPHED DOWNWARD (SMALL ANGLE)
403 PHOTOGRAPHED DOWNWARD (LARGE ANGLE)
407
404 PHOTOGRAPHED DOWNWARD (SMALL ANGLE)
405 PHOTOGRAPHED HORIZONTALLY
406
DETERMINE THAT TILT OPERATION IS PERFORMED
FIG. 4B
EXAMPLE ILLUSTRATED BY EQUIRECTANGULAR PROJECTION
HORIZONTAL CORRECTION ON [TILT CORRECTION ON, ROLL CORRECTION ON]
411
412
413
414
HORIZONTAL CORRECTION ON [TILT CORRECTION OFF, ROLL CORRECTION ON]
HORIZONTAL CORRECTION ON [TILT CORRECTION ON, ROLL CORRECTION ON]
415
416
417
418
FIG. 4C
CAMERA TILT ANGLE
421
HORIZONTAL DIRECTION COINCIDES WITH FRONT DIRECTION
422
INCLINED DOWNWARD (SMALL ANGLE)
423
INCLINED DOWNWARD (LARGE ANGLE)
424
INCLINED DOWNWARD (SMALL ANGLE)
425
HORIZONTAL DIRECTION COINCIDES WITH FRONT DIRECTION

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of an electronic device, and a non-transitory computer-readable medium.

Description of the Related Art

There is a camera capable of photographing one image including two parallax image areas using two optical systems facing the same direction (VR180 lens, dual lens). When the photographed image is divided into an image for right eye and an image for left eye and displayed on a head-mounted display (HMD), a user can stereoscopically view a VR image (for example, a VR180 image).

A front direction of the user when viewing the VR image is usually a horizontal direction. Therefore, based on orientation information of the camera during photography, horizontal correction is performed to reduce deviation in the horizontal direction (a tilt direction and a roll direction) regarding the front direction in the VR image. As there is a possibility that camera shake (blurring in a photographing direction) occurs when a moving image is photographed by a handheld device, horizontal correction is always performed.

JP 2012-90259 A discloses a technique of performing control according to a change in a photographing direction. In the technique disclosed in JP 2012-90259 A, moving image photography can be switched between 3D video photography and 2D video photography according to whether a tilt operation of inclining the camera in a tilt direction is performed.

However, when horizontal correction is always performed, a video on which an intentional tilt operation of a photographer is reflected (a video in which the horizontal direction is intentionally shifted from the front direction) cannot be photographed. The problem cannot be solved even when the technique disclosed in JP 2012-90259 A is used.

SUMMARY OF THE INVENTION

The present invention provides a technique capable of achieving both horizontal correction and reflection of intentional tilt operation.

The present invention in its first aspect provides an electronic device including: a processor; and a memory storing a program which, when executed by the processor, causes the electronic device to execute acquisition processing of acquiring information on orientation of an imaging apparatus during photography of an image; and to execute control processing of controlling, based on the information, whether to perform tilt correction on the image to bring a position corresponding to a horizontal direction during the photography closer to a position corresponding to a front direction.

The present invention in its second aspect provides an electronic device including: a processor; and a memory storing a program which, when executed by the processor, causes the electronic device to execute acquisition processing of acquiring information on orientation of an imaging apparatus; and to execute control processing of performing control to provide, based on the information, a second notification regarding whether to perform tilt correction on an image photographed by the imaging apparatus to bring a position corresponding to a horizontal direction close to a position corresponding to a front direction.

Further features of the present invention will become apparent from the following description of exemplary embodiments with reference to the attached drawings.

BRIEF DESCRIPTION OF THE DRAWINGS

FIGS. 4A, 4B, and 4C are schematic diagrams describing horizontal correction according to the first embodiment;

DESCRIPTION OF THE EMBODIMENTS

Hereinafter, embodiments of the present invention will be described with reference to the accompanying drawings.

First Embodiment

When photographing in VR180, a lens unit having two optical systems facing the same direction (dual-lens unit, VR180 lens unit) is used, VR180 being one of formats of VR images capable of dual stereoscopic vision. A circumferential fisheye lens capable of capturing a range of approximately 180 degrees is used for each optical system of the dual-lens unit. A front direction of the user when viewing the VR image is usually a horizontal direction. Therefore, an image photographed by the camera (imaging apparatus) equipped with the dual-lens unit is subjected to horizontal correction of bringing a position corresponding to the horizontal direction during photography of an image close to a position corresponding to the front direction. In horizontal correction, correction in a tilt direction is referred to as tilt correction, and correction in a roll direction is referred to as roll correction. The front direction of the user is, for example, a direction of the user wearing the HMD when the user faces the front. A front direction of the image is, for example, a direction of a display range displayed when the user wearing the HMD faces the front, or a direction of the display range displayed on the HMD at first.

Since the front direction of the user when viewing the VR image is usually the horizontal direction, a photographer holds the camera so that two optical systems of the dual-lens unit are arranged horizontally and photographs the VR image. Therefore, it is less likely that the photographer performs photography by largely inclining the camera in the roll direction. However, the photographer may perform photography by inclining the camera in the tilt direction. For example, when the photographer desires to photograph an image of a road (ground), the photographer performs photography by largely inclining the camera in the tilt direction.

Figure 1A:
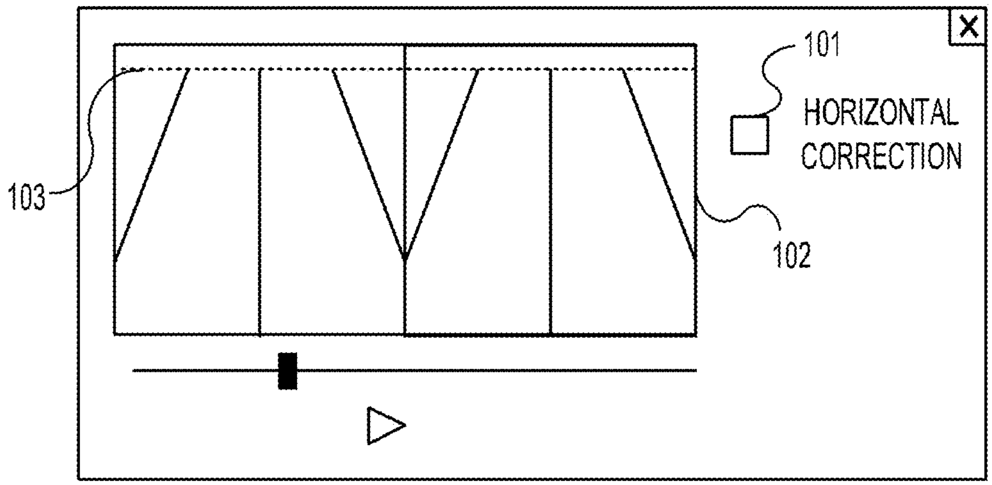
FIGS. 1A and 1B are schematic diagrams describing horizontal correction in the related art.
Figure 1B:
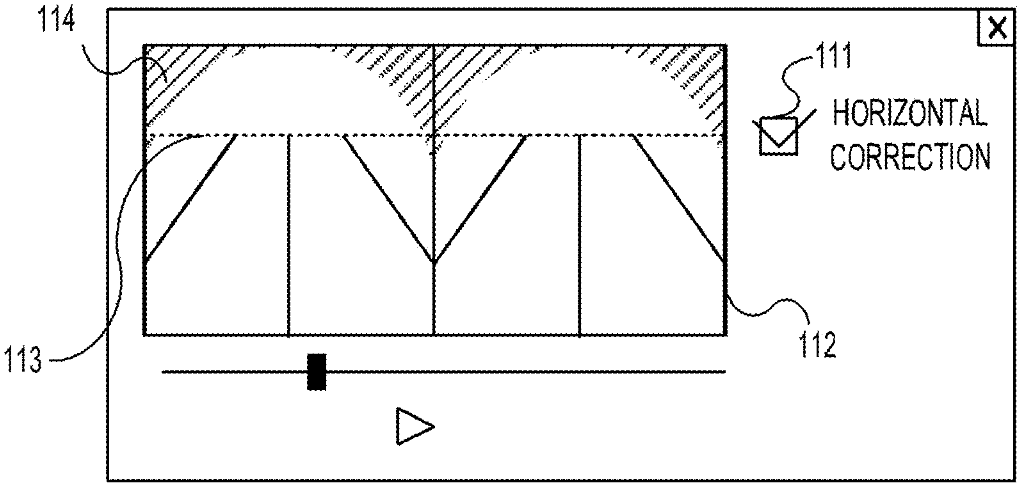

FIGS. 1A and 1B are schematic diagrams of a UI screen describing horizontal correction in the related art. Images 102 and 112 are images of a road photographed by performing tilt operation on a camera equipped with a dual-lens unit downward (tilt photographed). The images 102 and 112 are images after equirectangular transformation is performed on circumferential fisheye images. Check boxes 101 and 111 are check boxes for instructing whether to perform horizontal correction. Since the check box 101 is not checked, horizontal correction is not performed on the image 102. Since the check box 111 is checked, horizontal correction is performed on the image 112 compared to the image 102. The image 112 is an image after horizontal correction.

In the image 102, a horizon 103 is displayed at the upper side, and in the image 112, a horizon 113 is brought close to a center by horizontal correction. Since an angle of view of the dual-lens unit is not 360 degrees, depending on a tilt angle during photography, an invalid area 114 without video is included in the image 112 after horizontal correction is performed. Further, due to horizontal correction, the image 112 in which tilt operation is canceled is displayed instead of the image 102 reflecting tilt operation (operation of intentionally shifting the horizontal direction from the front direction, intentional tilt operation) of the photographer. Therefore, in a first embodiment, by determining whether to perform tilt correction based on orientation information of the camera during photography, both horizontal correction and reflection of intentional tilt operation are achieved.

Figure 2:
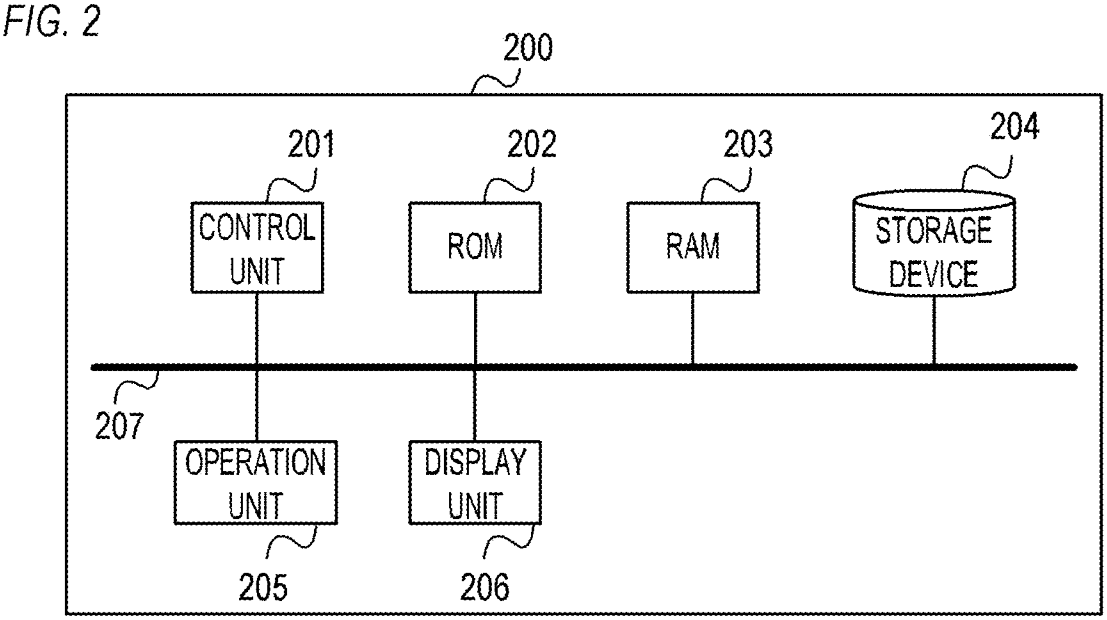
FIG. 2 is a block diagram illustrating a configuration of a playback device according to a first embodiment.

FIG. 2 is a block diagram illustrating an example of a configuration of a playback device (electronic device) 200 according to the first embodiment. The playback device 200 is an example of an image processing apparatus, and is, for example, a PC. The playback device 200 includes a control unit 201, a ROM 202, a RAM 203, a storage device 204, an operation unit 205, a display unit 206, and a system bus 207.

The control unit 201 controls the entire playback device 200. A control unit 201 is, for example, a central processing unit (CPU). The control unit 201 is made of at least one processor and/or at least one circuit. That is, the control unit 201 may be a processor, may be a circuit, or may be a combination of processor and circuit. The control unit 201 executes a program stored in the ROM 202 to implement each process of a flowchart to be described later.

The read only memory (ROM) 202 stores programs and parameters that do not need to be changed. Here, the program includes programs for performing flowcharts described below.

The random access memory (RAM) 203 temporarily stores constants and variables for operation of the control unit 201, programs and data supplied from the ROM 202 and external devices, and the like.

The storage device 204 stores moving image files and the like. For example, the storage device 204 may be a hard disk or a flash memory built in the playback device 200. The storage device 204 may be an optical disk detachable from the playback device 200 such as a floppy disk (FD) or a compact disk (CD), a magnetic card, an optical card, an IC card, or a memory card.

The operation unit 205 receives an operation from the user (user operation). For example, the operation unit 205 is a button or a touch panel. The operation unit 205 is used to input various operation instructions to the control unit 201.

The display unit 206 displays, for example, data stored in the playback device 200 or data supplied from external devices, and the like.

The system bus 207 communicably connects a plurality of functional units of the playback device 200 to each other.

Figure 3:
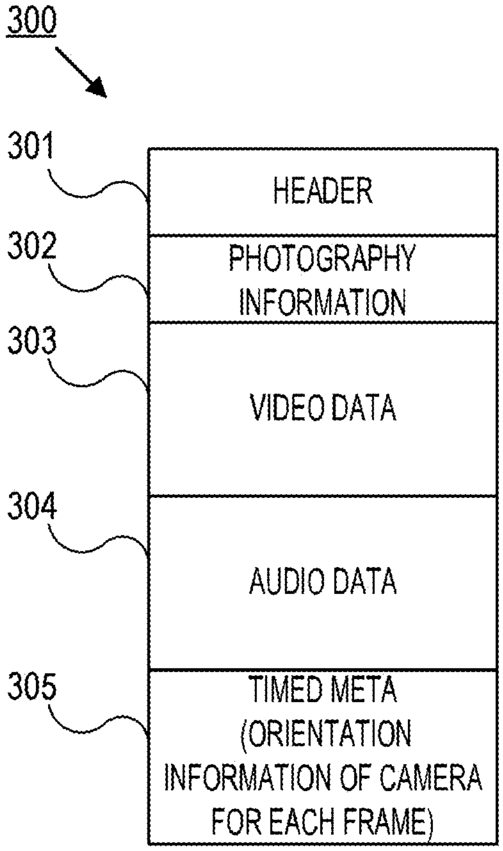
FIG. 3 is a schematic diagram of a structure of a moving image file.

FIG. 3 is a schematic diagram illustrating an example of a structure of a moving image file 300 handled by the playback device 200. The moving image file 300 illustrated in FIG. 3 includes a header 301, photography information 302, video data 303, audio data 304, and timed meta (timed metadata) 305.

In the header 301, information indicating a type or a structure of the moving image, such as whether the moving image is a VR180 moving image, is recorded. In the photography information 302, information such as a date and time of photography, a length (time) of a photographed moving image, a camera name and a lens name used for photography, and settings during photography is recorded. Photographed moving image data is recorded in the video data 303. Audio data of the photographed moving image is recorded in the audio data 304. Metadata such as orientation information of the camera for each frame is recorded in the timed meta 305. A tilt angle and a roll angle of the camera during photography are determined based on the orientation information.

FIGS. 4A to 4C are schematic diagrams describing horizontal correction according to the first embodiment. FIGS. 4A and 4B illustrate an example in which an image of a road photographed by a camera equipped with a dual-lens unit is illustrated by equirectangular projection. It is assumed that a left-right difference between a right image area and a left image area photographed by each optical system of the dual-lens unit is corrected, and only one of the right image area and the left image area is illustrated. FIG. 4C illustrates the tilt angle of the camera.

Frames 401 to 405 in FIG. 4A are frames after horizontal correction in the related art is performed, and tilt correction and roll correction are uniformly performed on all frames.

The frame 401 is a frame photographed by holding the camera horizontally. The frame 402 is a frame photographed by tilt-operating the camera downward, and a horizon in the frame 402 is shown at the same position as a horizon in the frame 401 by horizontal correction. The frame 403 is a frame photographed by further tilt-operating the camera more downward than the frame 402. Since the tilt angle is large, an invalid area 407 without video exists in the frame 403. The frame 404 is a frame photographed by tilt-operating the camera downward by a similar degree as the frame 402. The frame 405 is a frame photographed by holding the camera horizontally. A line 406 indicates positions of horizons in the frames 401 to 405.

Frames 411 to 415 in FIG. 4B are frames after horizontal correction according to the first embodiment is performed. The frames 411 to 415 correspond to the frames 401 to 405, respectively. In FIG. 4A, tilt correction is performed for all frames, but in FIG. 4B, it is determined whether to perform tilt correction for each frame, and tilt correction is not performed for the frames 412 to 414. Note that, also in FIG. 4B, roll correction is performed for all frames.

A line 416 indicates positions of horizons in the frame 411 and the frame 415. A line 417 indicates positions of horizons in the frame 412 and the frame 414. A line 418 indicates a position of a horizon in the frame 413.

FIG. 4C is a schematic diagram illustrating a tilt angle of the camera during photography of the frames 401 to 405 and 411 to 415.

A line 421 indicates a direction of the camera during photography of the frames 401 and 411. Since the frames 401 and 411 are photographed while the camera is held horizontally, the tilt angle here is 0 degrees.

An angle 422 indicates a tilt angle of the camera during photography of the frames 402 and 412. Since the frames 402 and 412 are frames immediately after starting the tilt operation, the angle 422 is smaller than an angle 423.

The angle 423 indicates a tilt angle of the camera during photography of the frames 403 and 413. The angle 423 is the largest of angles 422 to 424.

The angle 424 indicates a tilt angle of the camera during photography of the frames 404 and 414. Since the frame 404 and 414 are frames immediately before ending the tilt operation, the angle 424 is smaller than the angle 423.

A line 425 indicates a direction of the camera during photography of the frames 405 and 415. Since the frames 405 and 415 are photographed while the camera is held horizontally, the tilt angle here is 0 degrees.

As illustrated in the frames 402 to 404, the tilt operation is not reflected in the horizontal correction in the related art, but as illustrated in the frames 412 to 414, the tilt operation is reflected in the horizontal correction according to the first embodiment. Next, details of the horizontal correction according to the first embodiment will be described with reference to FIGS. 5 to 7.

Figure 5:
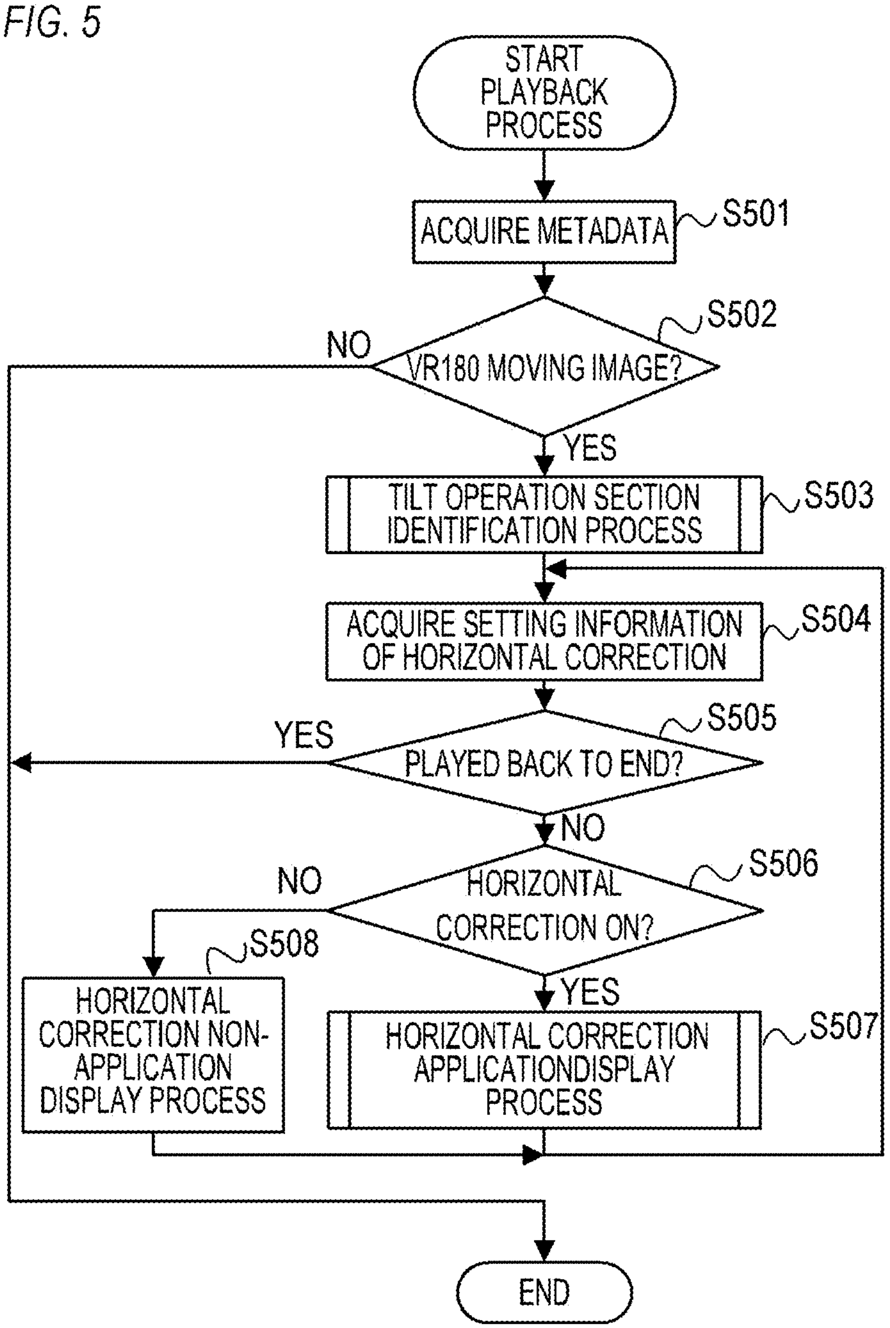
FIG. 5 is a flowchart illustrating a playback process according to the first embodiment.

FIG. 5 is a flowchart illustrating an example of a playback process of the playback device 200. The playback process is realized by the control unit 201 loading a program recorded in the ROM 202 to the RAM 203 and executing the program. For example, when the user operates the operation unit 205 to select the moving image file 300 and give a playback instruction, the playback process of FIG. 5 starts. Note that the playback instruction is an instruction performed on a moving image playback software, and includes, for example, a playback instruction to start playback from beginning of the moving image, a seek instruction to start playback from midway of the moving image, and the like.

In step S501, the control unit 201 acquires metadata of the moving image file 300. For example, the control unit 201 acquires data recorded in the header 301, the photography information 302, and the timed meta 305 illustrated in FIG. 3.

In step S502, the control unit 201 determines whether the moving image selected by the user is a VR180 moving image from the metadata acquired in step S501. When the moving image selected by the user is a VR180 moving image, the process proceeds to step S503, and otherwise, the processing flow ends.

In step S503, the control unit 201 performs processing of specifying a section in which the tilt operation has been performed (tilt operation section identification process) based on the orientation information recorded in the timed meta 305. The tilt operation section identification process will be described later with reference to FIG. 6.

In step S504, the control unit 201 acquires setting information of horizontal correction. For example, the user can set whether to enable or disable the horizontal correction by checking or unchecking the check box 101 on the moving image playback software in which the UI screen as illustrated in FIGS. 1A and 1B is displayed. When the check box 101 is checked, the control unit 201 acquires information indicating that setting of the horizontal correction is enabled (horizontal correction On). When the check box 101 is unchecked, the control unit 201 acquires information indicating that the horizontal correction is disabled (horizontal correction Off).

In step S505, the control unit 201 determines whether the moving image has been played back to the end. When the moving image has been played back to the end, the processing flow ends, and otherwise, the process proceeds to step S506. Note that the determination in step S505 may be performed before step S504.

In step S506, the control unit 201 determines whether the horizontal correction On is acquired in step S504. When horizontal correction On is acquired, the process proceeds to step S507, and otherwise, the process proceeds to step S508.

In step S507, the control unit 201 performs a process of performing horizontal correction and displaying a frame (horizontal correction application display process). The horizontal correction application display process will be described later with reference to FIG. 7.

In step S508, the control unit 201 performs a process of displaying a frame without performing the horizontal correction (horizontal correction non-application display process). When there is deviation in the horizontal direction (roll direction and tilt direction) regarding the front direction in the image (frame), the control unit 201 displays the image on the display unit 206 while the deviation remains. The displayed image is an image converted by equirectangular projection.

Figure 6:
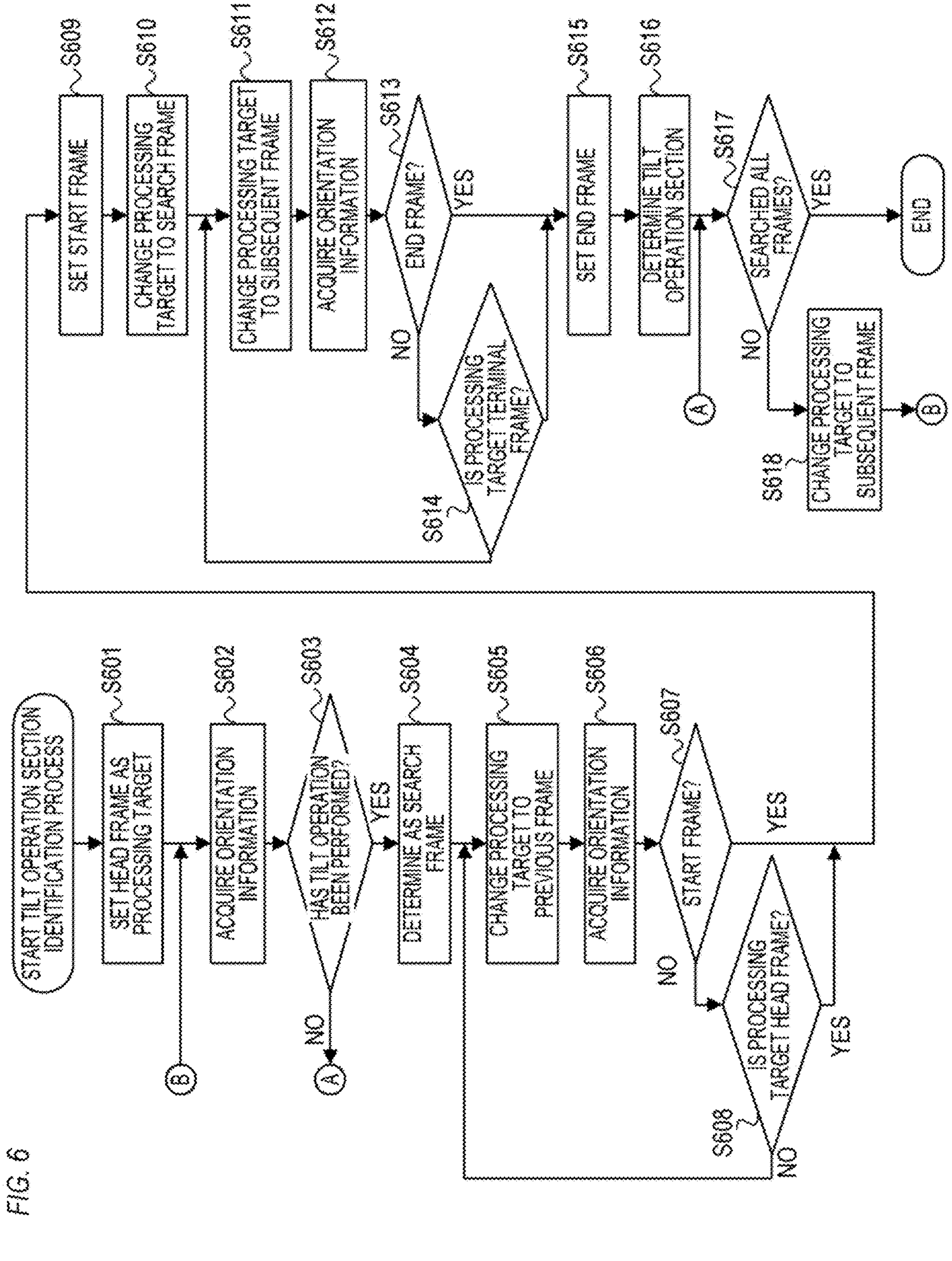
FIG. 6 is a flowchart illustrating a tilt operation section identification process.

The tilt operation section identification process in step S503 of FIG. 5 will be described with reference to FIG. 6.

In step S601, the control unit 201 sets a head frame of the moving image (a first frame of the moving image) as a target frame (processing target) to perform analysis from a head of the moving image file 300.

In step S602, the control unit 201 acquires orientation information of the camera during photography of the target frame from the timed meta 305.

In step S603, the control unit 201 determines whether tilt operation has been performed during photography of the target frame. When the tilt operation has been performed, the process proceeds to step S604, and otherwise, the process proceeds to step S617.

The process of step S603 will be described in detail. The control unit 201 applies the horizontal correction (tilt correction and roll correction) to the target frame and generates an image converted by the equirectangular projection (corrected image). In the roll correction, the control unit 201 acquires a roll angle from the orientation information of the camera and rotates the target frame by the roll angle to a side opposite to a direction of rolling. In the tilt correction, the control unit 201 acquires a tilt angle from the orientation information of the camera and rotates the target frame by the tilt angle to a side opposite to a direction of tilting. As such, a position corresponding to the horizontal direction during photography of the image can be brought close to a position corresponding to the front direction. The control unit 201 acquires a size of an invalid area without video in the image after correction. The invalid area is an area such as the invalid area 407 in FIG. 4A, and is an area in which the pixel values of RGB are all 0. Then, the control unit 201 acquires a ratio of the invalid area to the entire image after correction. The control unit 201 determines whether a ratio of the invalid area to the entire image after correction is larger than a threshold Th1 (for example, 10%). When the ratio is larger than the threshold Th1, the control unit 201 determines that the tilt operation has been performed during photography of the target frame, and otherwise, the control unit determines that the tilt operation has been not performed. In the example of FIG. 4A, the control unit 201 determines that the tilt operation is performed on the frame 403. The reason is that the ratio of the invalid area 407 to the entire frame 403 is larger than the threshold Th1.

Here, it is determined whether the tilt operation has been performed by determining whether the ratio of the invalid area is larger than the threshold Th1, but a method of determining whether the tilt operation has been performed is not limited thereto. For example, it may be determined whether the tilt operation has been performed by determining whether a tilt amount (tilt angle) is larger than a threshold or whether a size (for example, the number of pixels) of the invalid area is larger than a threshold. In addition, it may be determined whether the tilt operation has been performed by determining whether a size of an area (a ratio of the area to the entire image) not mapped to an output destination during calculation processing procedure of the equirectangular projection is larger than a threshold.

In step S604, the control unit 201 determines the current target frame as a search frame. The search frame is a frame that serves as a starting point for checking a frame from which the tilt operation started (start frame of the tilt operation) before the current target frame (search frame).

In step S605, the control unit 201 changes the target frame to a previous frame.

In step S606, the control unit 201 acquires orientation information of the camera during photography of the target frame from the timed meta 305.

In step S607, the control unit 201 determines whether the target frame is the start frame of the tilt operation based on the orientation information of the camera acquired in step S606. For example, when a tilt angle is smaller than a threshold Th2 (for example, 1 degree), the control unit 201 determines that the target frame is the start frame of the tilt operation. When the target frame is the start frame of the tilt operation, the process proceeds to step S609, and otherwise, the process proceeds to step S608. Note that the threshold Th2 is not limited to 1 degree, and may be, for example, 0 degrees. The control unit 201 may determine whether the target frame is the start frame of the tilt operation by determining whether a tilt amount (tilt angle) is larger than a threshold or whether a size of the invalid area is larger than a threshold. The threshold used for the determination in step S607 corresponds to a tilt amount smaller than the tilt amount corresponding to the threshold Th1 used for the determination in step S603.

In step S608, the control unit 201 determines whether the target frame is the head frame. When the target frame is the head frame, the process proceeds to step S609, and otherwise, the process proceeds to step S605.

In step S609, the control unit 201 sets the current target frame as the start frame of the tilt operation.

By repeating the process from step S605 to step S608, the control unit 201 searches for a frame that is the start frame of the tilt operation. In the example of FIG. 4A, the control unit 201 changes the target frame from the frame 403 to the frame 402, and searches for a frame whose tilt angle is smaller than the threshold Th2 toward the head of the moving image file 300. Since the angle 422 is smaller than the threshold Th2, in step S609, the control unit 201 sets the frame 402 as the start frame of the tilt operation. The frame 402 is a frame closest to the frame 403 among frames photographed before the frame 403 while the tilt angle is smaller than the threshold Th2. When there is no frame photographed before the frame 403 while the tilt angle is smaller than the threshold Th2, in step S609, the control unit 201 sets the head frame as the start frame of the tilt operation.

In step S610, the control unit 201 reads the search frame determined in step S604 and sets the search frame as the target frame.

In step S611, the control unit 201 changes the target frame to a subsequent (next) frame.

In step S612, the control unit 201 acquires orientation information of the camera during photography of the target frame from the timed meta 305.

In step S613, the control unit 201 determines whether the target frame is an end frame of the tilt operation based on the orientation information of the camera acquired in step S612. For example, when a tilt angle is smaller than a threshold Th3 (for example, 1 degree), the control unit 201 determines that the target frame is the end frame of the tilt operation. When the target frame is the end frame of the tilt operation, the process proceeds to step S615, and otherwise, the process proceeds to step S614. The threshold Th3 and the threshold Th2 used for the determination in step S607 may be the same value or different values.

In step S614, the control unit 201 determines whether the target frame is a terminal frame (a last frame of the moving image). When the target frame is the terminal frame, the process proceeds to step S615, and otherwise, the process proceeds to step S611.

In step S615, the control unit 201 sets the current target frame as the end frame of the tilt operation.

By repeating the process from step S611 to step S614, the control unit 201 searches for a frame that is the end frame of the tilt operation. In the example of FIG. 4A, the control unit 201 changes the target frame from the frame 403 to the frame 404, and searches for a frame whose tilt angle is smaller than the threshold Th3 toward a terminal of the moving image file 300. Since the angle 424 is smaller than the threshold Th3, in step S615, the control unit 201 sets the frame 404 as the end frame of the tilt operation. The frame 404 is the frame closest to the frame 403 among frames photographed after the frame 403 while the tilt angle is smaller than the threshold Th3. When there is no frame photographed after the frame 403 while the tilt angle is smaller than the threshold Th3, in step S615, the control unit 201 sets the terminal frame as the end frame of the tilt operation.

In step S616, the control unit 201 determines a period from the start frame set in step S609 to the end frame set in step S615 as a tilt operation section (identified period).

In step S617, the control unit 201 determines whether all frames of the moving image file 300 have been searched. When all frames of the moving image file 300 have been searched, the processing flow ends, and otherwise, the process proceeds to step S618.

In step S618, the control unit 201 changes the target frame to a subsequent frame.

Figure 7:
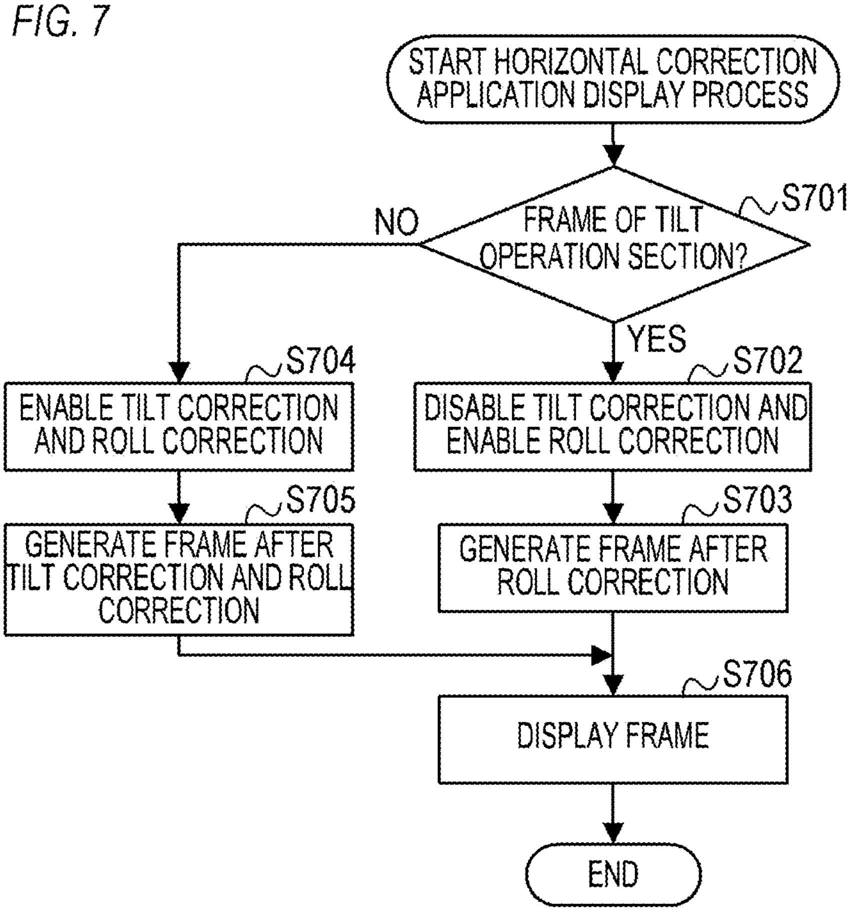
FIG. 7 is a flowchart illustrating a horizontal correction application display process according to the first embodiment.

The tilt operation section determined by the processing flow is used to determine whether the tilt operation section is a section in which an operation of the horizontal correction is to be changed in the processing flow of FIG. 7. When there are a plurality of tilt operation sections, the control unit 201 stores the plurality of sections.

The horizontal correction application display process in step S507 of FIG. 5 will be described with reference to FIG. 7.

In step S701, the control unit 201 determines whether a frame to be displayed is a frame corresponding to the tilt operation section. When the frame to be displayed is a frame corresponding to the tilt operation section, the process proceeds to step S702, and otherwise, the process proceeds to step S704.

In step S702, the control unit 201 disables the tilt correction. In a normal horizontal correction, the control unit 201 enables both the tilt correction and the roll correction, but in step S702, the operation of the horizontal correction is changed so that the tilt correction is disabled and only the roll correction is enabled.

In step S703, the control unit 201 generates a frame subjected to the roll correction (frame after roll correction).

In step S704, the control unit 201 enables the tilt correction and the roll correction.

In step S705, the control unit 201 generates a frame on which the tilt correction and the roll correction have been performed (frame after tilt correction and roll correction).

In step S706, the control unit 201 displays the frame generated in step S703 or step S705 and ends the processing flow.

As such, the control unit 201 determines the ratio of the invalid area in the image after the horizontal correction (roll correction and tilt correction) is performed to the entire image and controls not to perform the tilt correction when the ratio is larger than the threshold Th1. When the moving image includes a period to which it is determined that the tilt correction is not to be performed (a period in which the above ratio is larger than the threshold Th1), the control unit 201 performs control not to perform the tilt correction in an identified period including the period. In the example of FIG. 4B, the control unit 201 performs control not to perform the tilt correction in the period of the frames 412 to 414 that includes the frame 413 to which it is determined that the tilt correction is not to be performed. As a result, an image reflecting the tilt operation can be displayed. Further, it is possible to reduce display of an image including an invalid area. In the frames 411 and 415 that do not correspond to the tilt operation section, the tilt correction is performed, and the image in the horizontal direction is displayed when the user faces the front.

The control unit 201 may acquire information on orientation of the camera during photography and information on at least one of a type and an angle of view of a lens unit mounted on the camera during photography, and may determine whether to perform the tilt correction. For example, the threshold Th1 for determining whether to perform tilt correction may be determined based on the angle of view of the lens unit. The threshold Th1 may be set to 15% when the angle of view of the lens unit is 190 degrees and may be set to 5% when the angle of view of the lens unit is 170 degrees. Further, the thresholds Th1 to Th3 may be set by the user.

Although a case in which the processing target is the moving image file 300 has been described, the processing target may be a still image file. When metadata similar to that of the moving image file 300 is attached to the still image file, a process similar to the process performed in the moving image file 300 can be executed by continuously processing a plurality of still image files.

As described above, in the first embodiment, when intentional tilt operation is performed, the control unit 201 controls not to perform the tilt correction, and otherwise, the control unit 201 controls to perform the tilt correction. Accordingly, it is possible to achieve both horizontal correction and reflection of intentional tilt operation.

Second Embodiment

In the first embodiment, a threshold for determining whether to perform tilt correction is a fixed value that does not depend on a lens used for photography. In the second embodiment, a threshold for determining whether to perform tilt correction is changed depending on a lens to be used for photography. Further, notification regarding whether to perform tilt correction is performed. Hereinafter, differences from the first embodiment will be mainly described.

Figure 8:
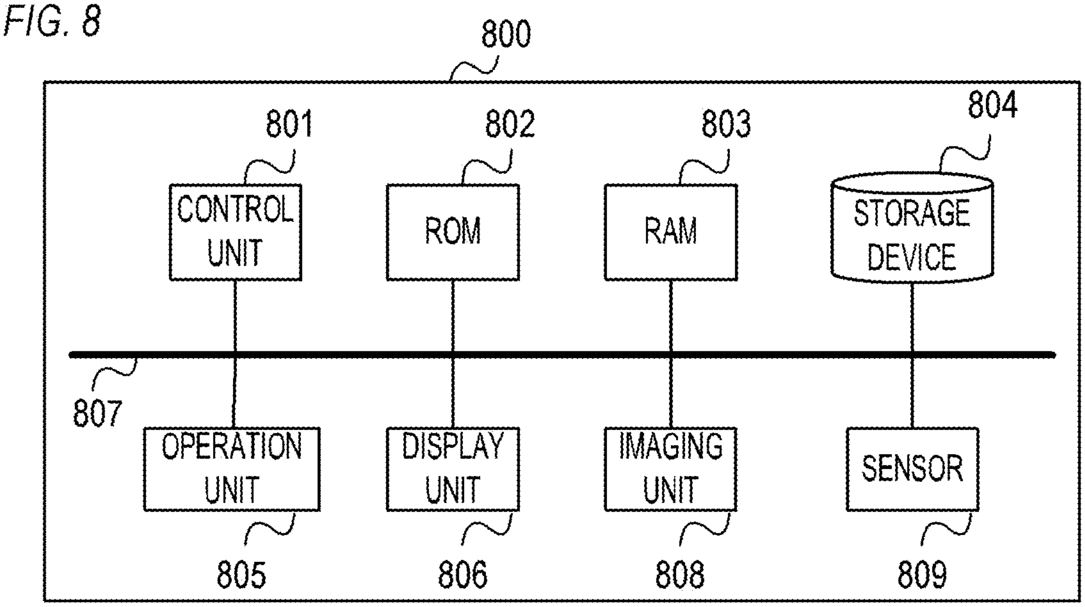
FIG. 8 is a block diagram illustrating a configuration of a camera according to a second embodiment.

FIG. 8 is a block diagram illustrating an example of a configuration of a camera 800 according to the second embodiment. The camera 800 is an example of an image processing apparatus, and includes a control unit 801, a ROM 802, a RAM 803, a storage device 804, an operation unit 805, a display unit 806, a system bus 807, an imaging unit 808, and a sensor 809. Functions of the control unit 801, the ROM 802, the RAM 803, and the storage device 804 are similar to the functions of the control unit 201, the ROM 202, the RAM 203, and the storage device 204 in the playback device 200 of FIG. 2. Further, functions of the operation unit 805, the display unit 806, and the system bus 807 are similar to the functions of the operation unit 205, the display unit 206, and the system bus 207 in the playback device 200.

The imaging unit 808 is, for example, a charge coupled device (CCD) and inputs a video signal.

The sensor 809 is a sensor for acquiring orientation information of the camera 800. For example, an acceleration sensor, a gyro sensor, or the like can be used for the sensor 809.

It is assumed that a structure of a moving image file recorded by the camera 800 is the same as that in the example of FIG. 3, and that the playback device 200 of FIG. 2 plays back the moving image file recorded by the camera 800.

Figure 9:
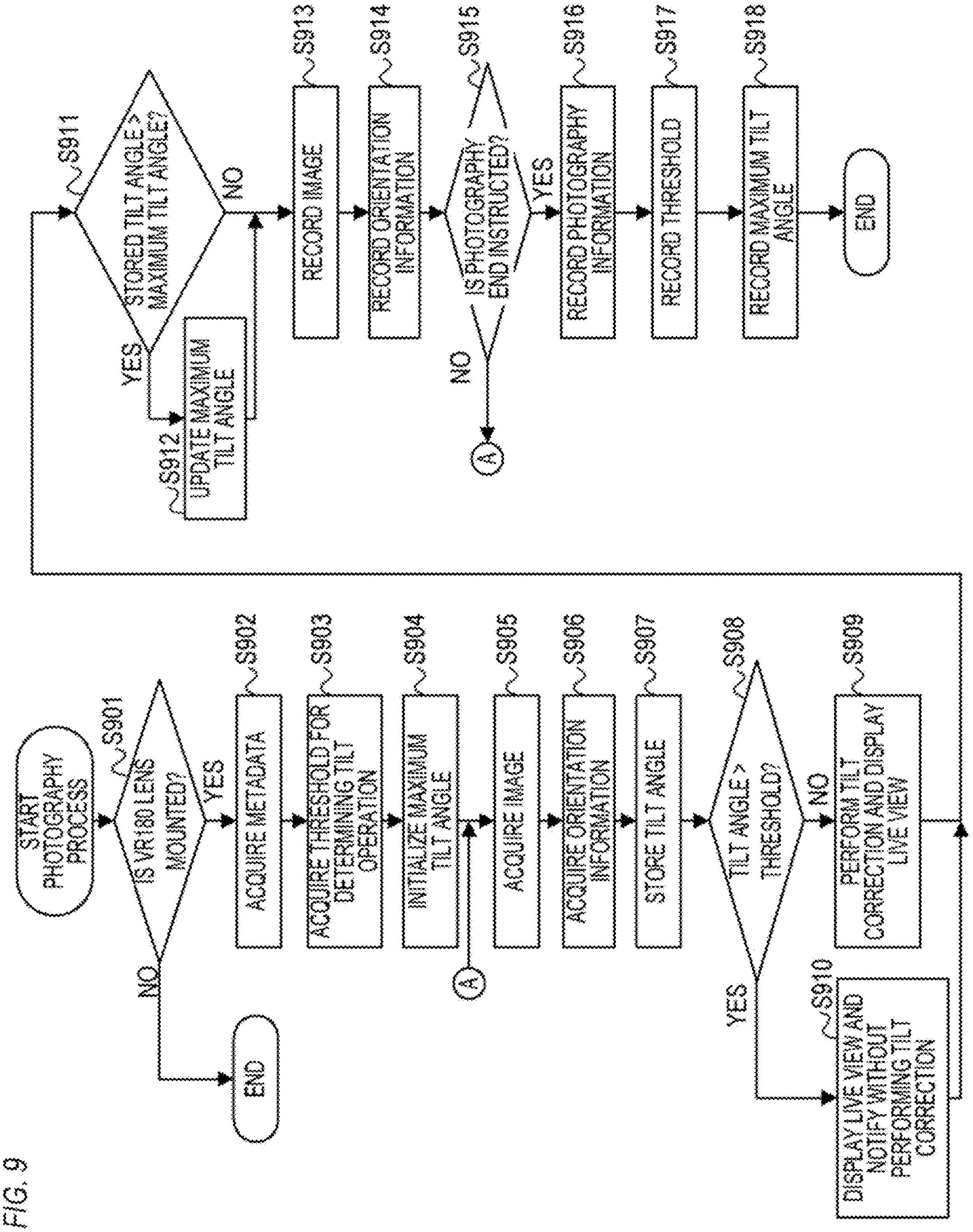
FIG. 9 is a flowchart illustrating a photography process according to the second embodiment.

FIG. 9 is a flowchart illustrating an example of a photography process of the camera 800. The photography process is realized by the control unit 801 loading a program recorded in the ROM 802 to the RAM 803 and executing the program. For example, when the user operates the operation unit 805 to give an instruction to start photography, the photography process in FIG. 9 starts.

In step S901, the control unit 801 determines whether the mounted lens is a VR180 lens. When the mounted lens is a VR180 lens, the process proceeds to step S902, and otherwise, the processing flow ends.

In step S902, the control unit 801 acquires metadata indicating a lens name, an angle of view of the lens, an adjustment value of optical correction, and the like from the VR180 lens.

In step S903, the control unit 801 acquires a threshold Th4 for determining the tilt operation. The threshold Th4 is a threshold for determining whether a tilt operation has been performed (tilt correction is not to be performed) when a tilt amount (for example, tilt angle) is larger than a value of the threshold Th4. When the threshold Th4 is recorded in the lens, the control unit 801 acquires the threshold Th4 from the lens. When the threshold Th4 determined for each lens is recorded in the ROM 802, the control unit 801 acquires the threshold Th4 corresponding to the mounted lens from the ROM 802. The threshold Th4 may be a value that can be set by the user. The threshold Th4 is determined based on, for example, the angle of view of the lens.

In step S904, the control unit 801 initializes a stored maximum tilt angle to 0 degrees.

In step S905, the control unit 801 acquires an image (live image) captured by the imaging unit 808.

In step S906, the control unit 801 acquires current orientation information of the camera 800 output from the sensor 809.

In step S907, the control unit 801 stores a tilt angle indicated by the orientation information acquired in step S906 as an absolute value. The reason why the tilt angle is stored as an absolute value is that up-and-down directions are not differentiated when determining whether the tilt operation has been performed.

In step S908, the control unit 801 determines whether the current tilt angle stored in step S907 is larger than the threshold Th4 acquired in step S903. When the current tilt angle is larger than the threshold Th4, the process proceeds to step S910, and otherwise, the process proceeds to step S909.

In step S909, the control unit 801 displays (in live view) the image captured by the imaging unit 808 and subjected to the tilt correction on the display unit 806.

Figure 10:
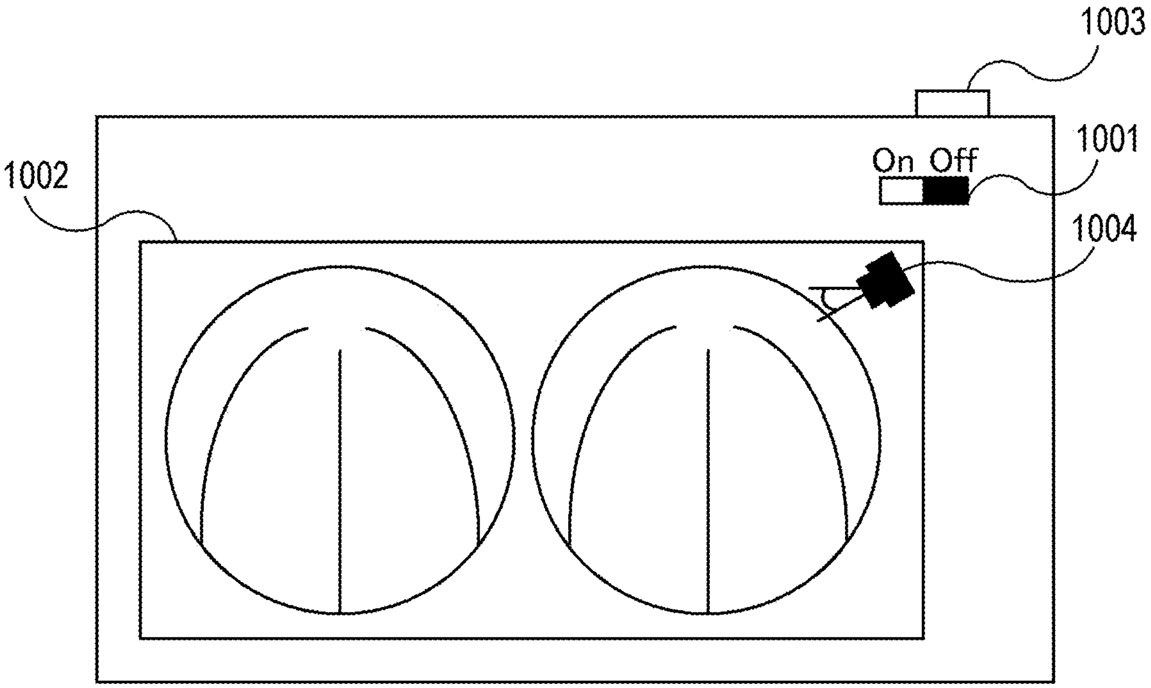
FIG. 10 is a schematic diagram of the camera according to the second embodiment as viewed from a back surface.

In step S910, the control unit 801 displays the image captured by the imaging unit 808 and not subjected to the tilt correction on the display unit 806. Further, the control unit 801 issues a notification indicating that it is determined that the tilt operation has been performed. An icon 1004 in FIG. 10 is an example of an icon displayed by the notification in step S910, and indicates that the tilt operation is being performed. The control unit 801 may make a notification by a method other than displaying an icon (for example, display of text, lighting of lamp, output of sound, and the like).

Note that the control unit 801 is not limited to making a notification when displaying an image without performing the tilt correction (step S910), and may make a notification when performing the tilt correction and displaying an image (step S909). For example, in step S909, the control unit 801 may make a notification indicating that it is not determined that the tilt operation has been performed or that the tilt correction has been performed. The roll correction is performed in both step S909 and step S910.

In step S911, the control unit 801 determines whether the tilt angle stored in step S907 is larger than the maximum tilt angle. The maximum tilt angle is the value initialized in step S904 (0 degrees) when the maximum value of the tilt angle is not updated in step S912, and is the updated value when the maximum value of the tilt angle is updated in step S912. When the tilt angle stored in step S907 is larger than the stored maximum tilt angle, the process proceeds to step S912, and otherwise, the process proceeds to step S913.

In step S912, the control unit 801 updates the maximum tilt angle to the tilt angle stored in step S907.

In step S913, the control unit 801 records the image acquired in step S905 in the video data 303.

In step S914, the control unit 801 records the orientation information acquired in step S906 in the timed meta 305. Note that the control unit 801 may record the orientation information in another file associated with the moving image file 300 other than the timed meta 305.

In step S915, the control unit 801 determines whether the user operated the operation unit 805 (for example, presses a button 1003 in FIG. 10) to give an instruction to end photography. When the instruction to end photography is given, the process proceeds to step S916, and otherwise, the process proceeds to step S905. The control unit 801 repeats the process from step S905 to step S915 until the instruction to end photography is given in step S915.

In step S916, the control unit 801 records information such as a date and time of photography and a camera name and a lens name used in the photography in the photography information 302.

In step S917, the control unit 801 records the threshold used in the photography (the threshold Th4 acquired in step S903) as a part of the metadata of the moving image file 300.

In step S918, the control unit 801 records the stored maximum tilt angle as a part of the metadata of the moving image file 300.

By reading the values recorded in steps S916 to S918 during playback of the moving image, it is possible to easily determine whether the tilt operation has been performed during photography of the moving image by using the threshold Th4 corresponding to the lens used for the photography of the moving image. Note that the maximum tilt angle may be calculated by searching all frames during playback of the moving image.

Although an example in which the image before horizontal correction is always recorded has been described, there may be other examples. For example, the image displayed on the display unit 806 (the image displayed in step S909 or S910) may be recorded. Then, the horizontal correction (tilt correction or roll correction) during playback becomes unnecessary.

FIG. 10 is a schematic diagram of the camera 800 as viewed from the back surface (a side opposite to an object side). A switch 1001 is a power switch that switches between On and Off of a power of the camera 800, and is an example of the operation unit 805. A display unit 1002 is an example of the display unit 806 that displays a live view image of the camera 800. A button 1003 is a shutter button for giving a photography instruction of a still image or a moving image, and is an example of the operation unit 805. The icon 1004 is an example of the icon notified in step S910 indicating that the tilt operation is being performed. The user can recognize that the tilt operation is being performed by looking at the icon 1004.

Figure 11:
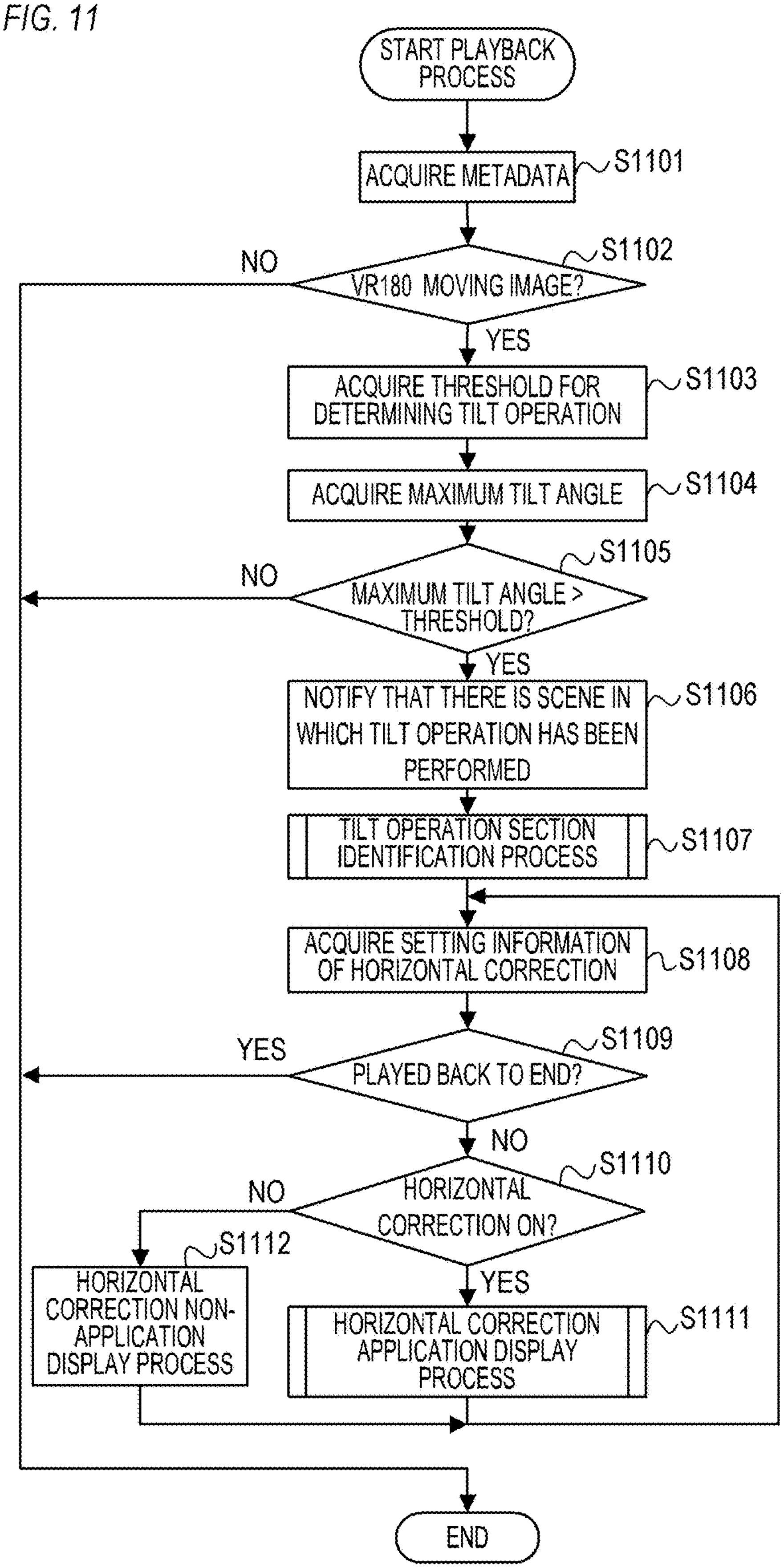
FIG. 11 is a flowchart illustrating a playback process according to the second embodiment.

FIG. 11 is a flowchart illustrating an example of a playback process of the playback device 200 according to the second embodiment. The playback process is realized by the control unit 201 loading a program recorded in the ROM 202 to the RAM 203 and executing the program. For example, when the user operates the operation unit 205 to select the moving image file and give a playback instruction, the playback process of FIG. 11 starts. Steps S1101, S1102, and S1107 to S1112 are the same as steps S501, S502, and S503 to S508 of FIG. 5. The threshold Th1 is used in the tilt operation section identification process of the first embodiment, but the threshold Th4 is used in the tilt operation section identification process of the second embodiment. Note that the control unit 201 may perform the tilt operation section identification process during playback of the moving image by using a threshold different from the threshold Th4 used during photography of the moving image. Further, information indicating the tilt operation section may be recorded during photography, and the control unit 201 may perform control not to perform the tilt correction in a period indicated by the information.

In step S1103, the control unit 201 acquires the threshold Th4 recorded in step S917 of FIG. 9 from the moving image file 300.

In step S1104, the control unit 201 acquires the maximum tilt angle recorded in step S918 from the moving image file 300.

In step S1105, the control unit 201 determines whether the maximum tilt angle acquired in step S1104 is larger than the threshold Th4 acquired in step S1103. When the maximum tilt angle is larger than the threshold Th4, the process proceeds to step S1106, and otherwise, the processing flow ends.

In step S1106, the control unit 201 makes a notification indicating that the tilt operation has been performed during photography of the playing moving image (there is a scene in which the tilt operation has been performed). For example, the control unit 201 displays a text "intentional tilt operation has been performed" in an area 1304 of FIG. 13 to indicate that the tilt operation has been performed during photography. Note that the notification is not limited to display of text, and may be performed by display of icon or output of voice.

Figure 12:
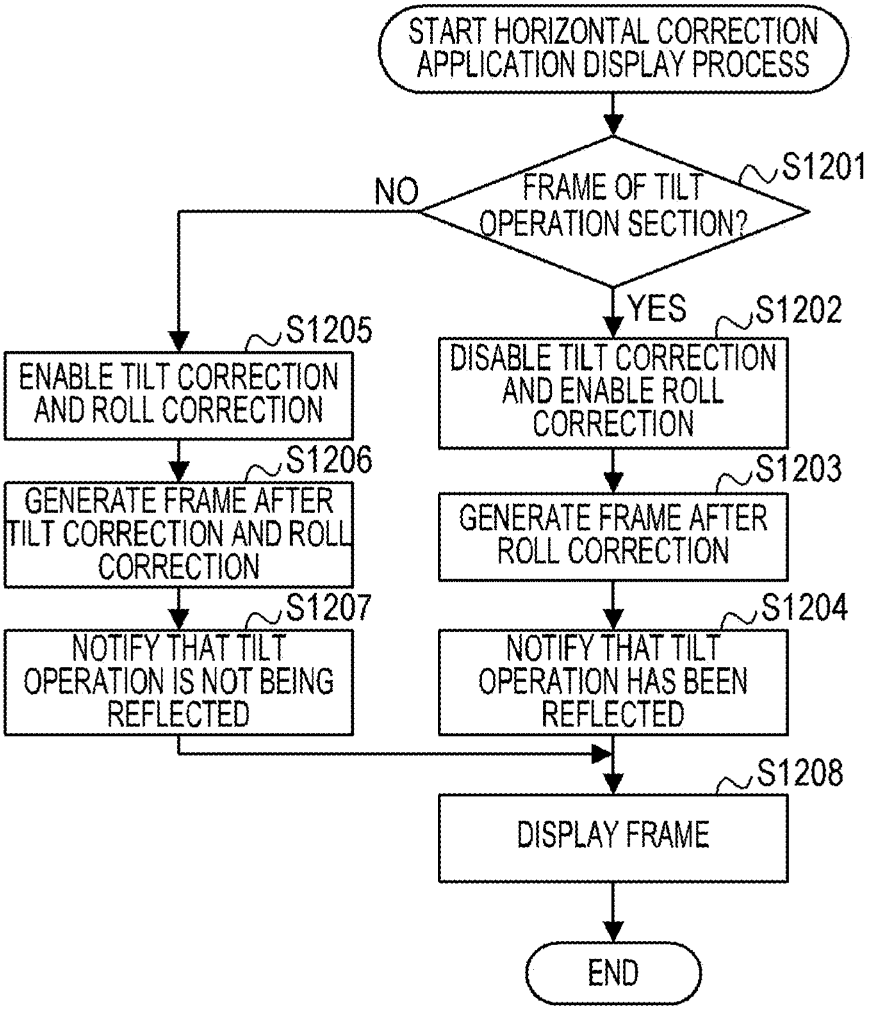
FIG. 12 is a flowchart illustrating a horizontal correction application display process according to the second embodiment.

The horizontal correction application display process in the second embodiment (step S1111 of FIG. 11) is different from the horizontal correction application display process in the first embodiment (step S507 of FIG. 5). The horizontal correction application display process in step S1111 of FIG. 11 will be described with reference to FIG. 12. Steps S1201 to S1203, S1205, S1206, and S1208 are the same as steps S701 to S706 of FIG. 7.

In step S1204, the control unit 201 makes a notification indicating that the tilt operation has been reflected. For example, the control unit 201 displays text "intentional tilt operation is being reflected" in an area 1303 in FIG. 13 to indicate that the tilt operation has been reflected. As such, the control unit 201 performs control to notify whether the tilt correction is performed based on the orientation information of the camera. When a tilt amount of the camera corresponding to the orientation information is a tilt amount for which tilt correction is not performed, the control unit 201 performs control to make a notification indicating that the tilt operation has been reflected. As a result, the user can easily recognize whether the tilt correction is performed (whether the tilt operation is reflected).

In step S1207, the control unit 201 makes a notification indicating that the tilt operation is not being reflected (the operation of the horizontal correction is not changed). For example, the control unit 201 displays text "tilt correction and roll correction is being applied" indicating that the tilt operation is not being reflected in the area 1303.

In steps S1204 and S1207, the control unit 201 makes a notification by display of text, but may make a notification by display of icon, for example.

Figure 13:
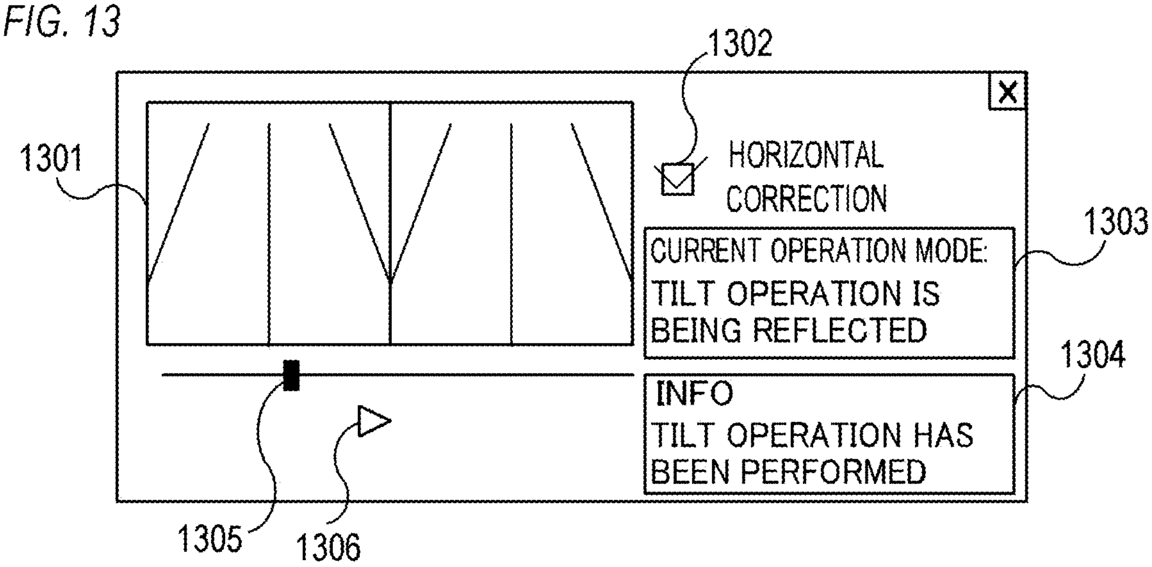
FIG. 13 is a schematic diagram illustrating a UI screen according to the second embodiment.

FIG. 13 is a schematic diagram of a UI screen displayed on the display unit 206.

An image 1301 is an image including a plurality of image areas (a left image area and a right image area) photographed by a plurality of optical systems of a dual-lens unit. The image 1301 is an image obtained by converting circumferential fisheye images by equirectangular projection. A bar 1305 is a position bar indicating a playback position of a moving image. The user can operate the bar 1305 to display a certain frame. A button 1306 is a playback button for instructing playback of the moving image.

A check box 1302 is a check box for instructing enabling or disabling (application or non-application) of the horizontal correction.

The area 1303 is an area indicating information regarding an operation mode of the horizontal correction. When the check box 1302 is unchecked and the horizontal correction is disabled, a display indicating that the horizontal correction is disabled (display of blank, display of "horizontal correction is disabled", and the like) is performed in the area 1303. When the check box 1302 is checked and the horizontal correction is enabled, a display indicating an operation state of the horizontal correction (whether the tilt operation is being reflected) is performed.

The area 1304 is an area indicating whether the tilt operation has been performed during photography of the playing moving image. In the area 1304, a display indicating whether the currently displayed frame is a frame on which the tilt operation has been performed may be performed.

The control unit 201 may give a notification indicating that the tilt operation has been performed for each moving image file when displaying a list of candidates of a moving image file to be played back on the UI screen of the moving image playback software instead of during playback of the moving image.

In the first embodiment and the second embodiment, only a tilt component and a roll component are corrected in the horizontal correction. Even if three components of pan, tilt, and roll are correction targets of horizontal correction, when an intentional tilt operation is performed during photography of an image, the control unit 201 performs control not to perform the tilt correction on the image. Further, when an intentional pan operation is performed during photography of an image, the control unit 201 performs control not to perform pan correction (correction for reducing deviation in a panning direction regarding the front direction in the image) on the image. When an intentional operation is performed in an oblique direction during photography of an image, the control unit 201 performs control not to perform correction in the oblique direction (pan correction and tilt correction) on the image.

The control unit 201 may further perform a process of reducing blurs in a video due to camera shake during photography. For example, the control unit 201 may perform a process of reducing blurs in a video in the up-and-down directions due to camera shaking in the tilt direction during photography.

As described above, in the second embodiment, the threshold for determining whether an intentional tilt operation has been performed is changed depending on the lens used for photography. As a result, it is possible to more suitably determine (with high accuracy) whether an intentional tilt operation has been performed. Further, notification is performed when an intentional tilt operation has been performed during photography of a moving image and when a scene in which an intentional tilt operation has been performed during photography is played back. As a result, the user can easily recognize whether an intentional tilt operation has been performed.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth.

Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

For example, it is described that one image in which two parallax image areas are arranged side by side is acquired, but the number of image areas, that is, the number of optical systems may be larger than two and an arrangement of a plurality of image areas is not particularly limited.

The present invention is not limited to a camera or a PC and is applicable to any electronic device that can handle an image including a plurality of image areas corresponding to a plurality of optical systems. For example, the present invention is applicable to a PDA, a mobile phone terminal, a portable image viewer, a printer device, a digital photo frame, a music player, a video game machine, an electronic book reader, a cloud server, and the like. The present invention is further applicable to, for example, a video player, a display device (including a projector), a tablet terminal, a smartphone, an AI speaker, a home electrical appliance device, and an on-vehicle apparatus. The invention is also applicable to a multi-view smartphone or the like with a plurality of optical systems of different types, such as a standard lens, a wide-angle lens, and a zoom lens.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to achieve both horizontal correction and reflection of intentional tilt operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-026389, filed on Feb. 26, 2024, which is hereby incorporated by reference herein in its entirety.

What is claimed is:

1. An electronic device comprising:

a processor; and a memory storing a program which, when executed by the processor, causes the electronic device to;

(1) execute acquisition processing of acquiring information on orientation of an imaging apparatus during photography of an image; and (2) execute control processing of controlling, based on the information, whether to perform tilt correction on the image to bring a position corresponding to a horizontal direction during the photography closer to a position corresponding to a front direction, wherein (A) in the control processing, (1) a size of an invalid area without video in an image after the tilt correction is performed is determined based on the information and (2) control is performed not to perform the tilt correction in a case where the size is larger than a first threshold, or (B) in the control processing, (1) a ratio of an invalid area without video in an image after the tilt correction is performed to the entirety of the image is determined based on the information and (2) control is performed not to perform the tilt correction in a case where the ratio is larger than a second threshold.

2. The electronic device according to claim 1, wherein in the acquisition processing, the information on the orientation of the imaging apparatus during the photography and at least one of a type and an angle of view of a lens unit mounted on the imaging apparatus during the photography are acquired.

3. The electronic device according to claim 1, wherein in the control processing, (1) the size of an invalid area without video in an image after the tilt correction is performed is determined based on the information and (2) control is performed not to perform the tilt correction in a case where the size is larger than the first threshold.

4. The electronic device according to claim 1, wherein in the control processing, (1) the ratio of an invalid area without video in an image after the tilt correction is performed to the entirety of the image is determined based on the information and (2) control is performed not to perform the tilt correction in a case where the ratio is larger than the second threshold.

5. The electronic device according to claim 1, wherein in the control processing, control is performed not to perform the tilt correction in a case where a tilt amount of the imaging apparatus corresponding to the information is larger than a third threshold.

6. The electronic device according to claim 1, wherein in the control processing, control is performed to provide a first notification when an image on which the tilt correction is not performed is displayed.

7. The electronic device according to claim 1, wherein the image includes a plurality of image areas photographed through a plurality of optical systems, respectively.

8. The electronic device according to claim 1, wherein the program, when executed by the processor, further causes the electronic device to execute correction processing of performing the tilt correction.

9. An electronic device comprising:

a processor; and a memory storing a program which, when executed by the processor, causes the electronic device to:

(1) execute acquisition processing of acquiring information on orientation of an imaging apparatus during photography of an image; and (2) execute control processing of controlling, based on the information, whether to perform tilt correction on the image to bring a position corresponding to a horizontal direction during the photography closer to a position corresponding to a front direction, wherein in a case where a moving image photographed by the imaging apparatus includes a period in which it is determined that the tilt correction is not to be performed, in the control processing, control is performed not to perform the tilt correction in an identified period including the period, and wherein a start frame of the identified period is a frame closest to the period in which it is determined that the tilt correction is not to be performed among frames photographed before the period in which it is determined that the tilt correction is not to be performed while a tilt amount of the imaging apparatus is smaller than a threshold.

10. The electronic device according to claim 9, wherein the start frame of the identified period is a first frame of the moving image in a case where there is no frame photographed before the period in which it is determined that the tilt correction is not to be performed while the tilt amount of the imaging apparatus is smaller than the threshold.

11. The electronic device according to claim 9, wherein an end frame of the identified period is a frame closest to the period in which it is determined that the tilt correction is not to be performed among frames photographed after the period in which it is determined that the tilt correction is not to be performed while the tilt amount of the imaging apparatus is smaller than a second threshold.

12. The electronic device according to claim 11, wherein the end frame of the identified period is a last frame of the moving image in a case where there is no frame photographed after the period in which it is determined that the tilt correction is not to be performed while the tilt amount of the imaging apparatus is smaller than the second threshold.

13. A control method of an electronic device, the control method comprising:

acquiring information on orientation of an imaging apparatus during photography of an image; and controlling, based on the information, whether to perform tilt correction on the image to bring a position corresponding to a horizontal direction during the photography closer to a position corresponding to a front direction, wherein (A) in the controlling, (1) a size of an invalid area without video in an image after the tilt correction is performed is determined based on the information and (2) control is performed not to perform the tilt correction in a case where the size is larger than a first threshold, or (B) in the controlling, (1) a ratio of an invalid area without video in an image after the tilt correction is performed to the entirety of the image is determined based on the information and (2) control is performed not to perform the tilt correction in a case where the ratio is larger than a second threshold.

14. A non-transitory computer-readable medium that stores a program, wherein the program causes a computer to execute a control method of an electronic device, the control method comprising:

acquiring information on orientation of an imaging apparatus during photography of an image; and controlling, based on the information, whether to perform tilt correction on the image to bring a position corresponding to a horizontal direction during the photography closer to a position corresponding to a front direction, wherein (A) in the controlling, (1) a size of an invalid area without video in an image after the tilt correction is performed is determined based on the information and (2) control is performed not to perform the tilt correction in a case where the size is larger than a first threshold, or (B) in the controlling, (1) a ratio of an invalid area without video in an image after the tilt correction is performed to the entirety of the image is determined based on the information and (2) control is performed not to perform the tilt correction in a case where the ratio is larger than a second threshold.

15. A control method of an electronic device, the control method comprising:

acquiring information on orientation of an imaging apparatus during photography of an image; and controlling, based on the information, whether to perform tilt correction on the image to bring a position corresponding to a horizontal direction during the photography closer to a position corresponding to a front direction, wherein in a case where a moving image photographed by the imaging apparatus includes a period in which it is determined that the tilt correction is not to be performed, in the controlling, control is performed not to perform the tilt correction in an identified period including the period, and wherein a start frame of the identified period is a frame closest to the period in which it is determined that the tilt correction is not to be performed among frames photographed before the period in which it is determined that the tilt correction is not to be performed while a tilt amount of the imaging apparatus is smaller than a threshold.

16. A non-transitory computer-readable medium that stores a program, wherein the program causes a computer to execute a control method of an electronic device, the control method comprising:

acquiring information on orientation of an imaging apparatus during photography of an image; and controlling, based on the information, whether to perform tilt correction on the image to bring a position corresponding to a horizontal direction during the photography closer to a position corresponding to a front direction, wherein in a case where a moving image photographed by the imaging apparatus includes a period in which it is determined that the tilt correction is not to be performed, in the controlling, control is performed not to perform the tilt correction in an identified period including the period, and wherein a start frame of the identified period is a frame closest to the period in which it is determined that the tilt correction is not to be performed among frames photographed before the period in which it is determined that the tilt correction is not to be performed while a tilt amount of the imaging apparatus is smaller than a threshold.

* * * * *